June 7, 1938.  H. M. HESSENBRUCH  2,119,942
TRIMMING MACHINE
Filed Feb. 10, 1937  5 Sheets-Sheet 2
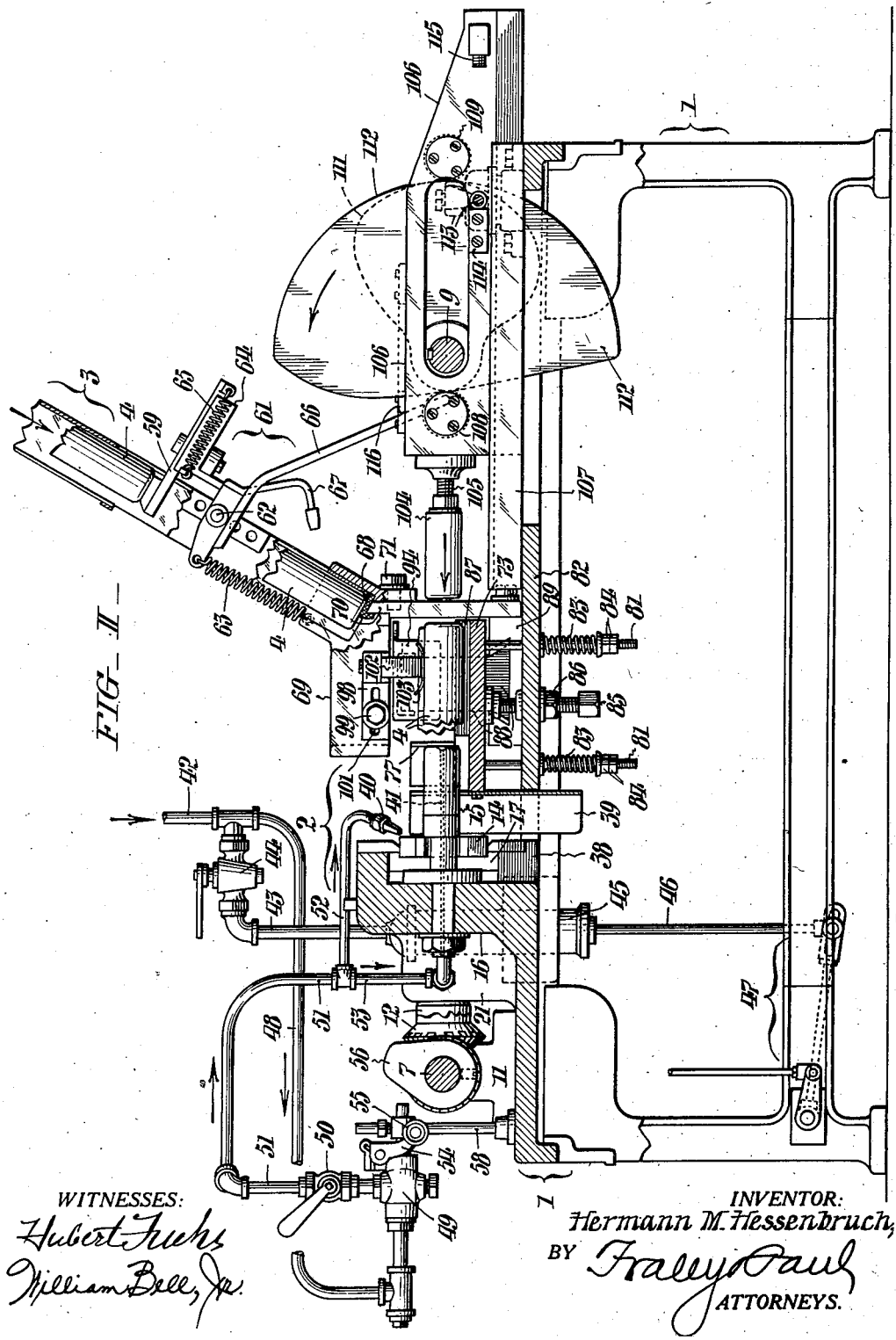
INVENTOR:
Hermann M. Hessenbruch,
BY
ATTORNEYS.

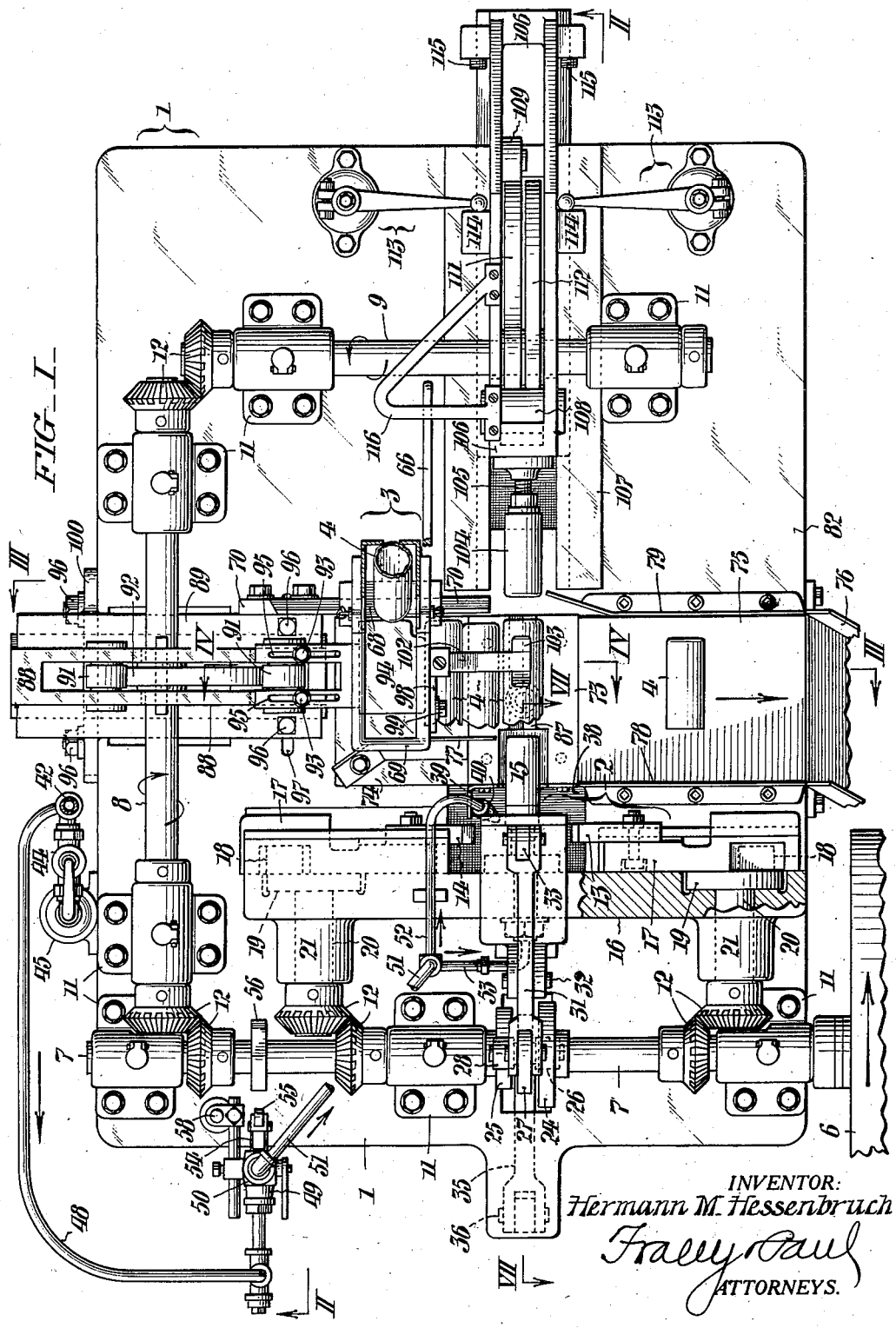

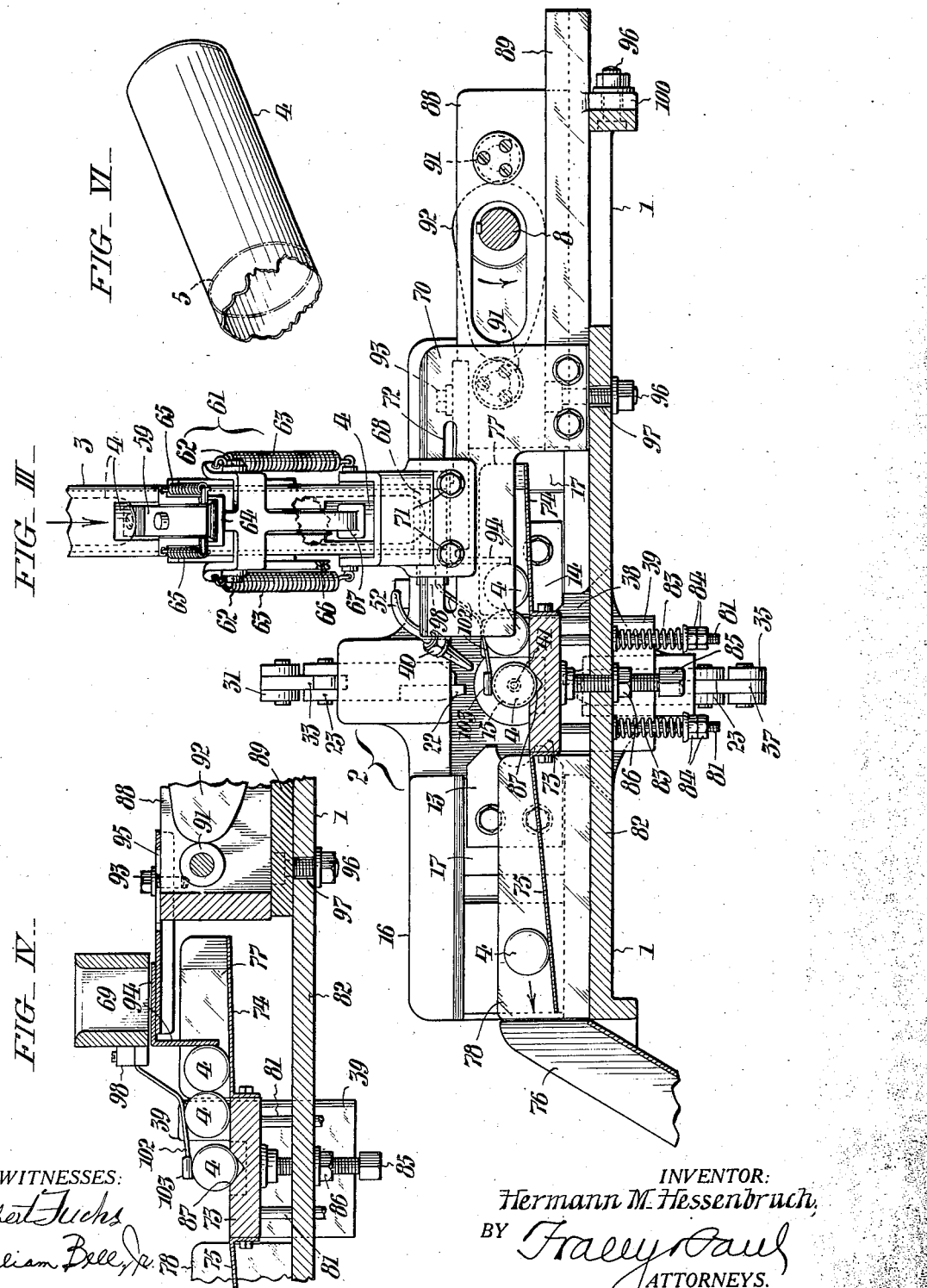

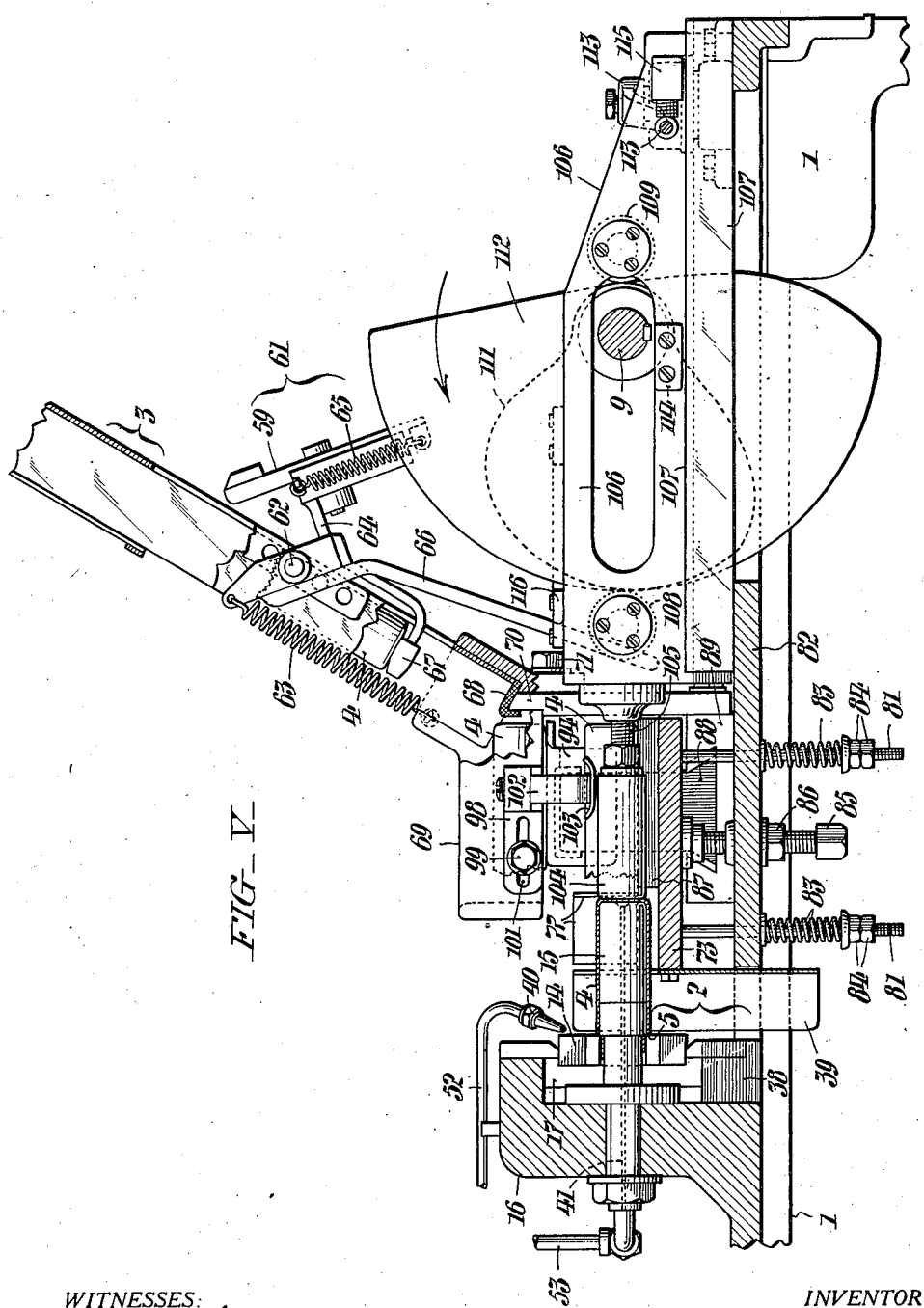

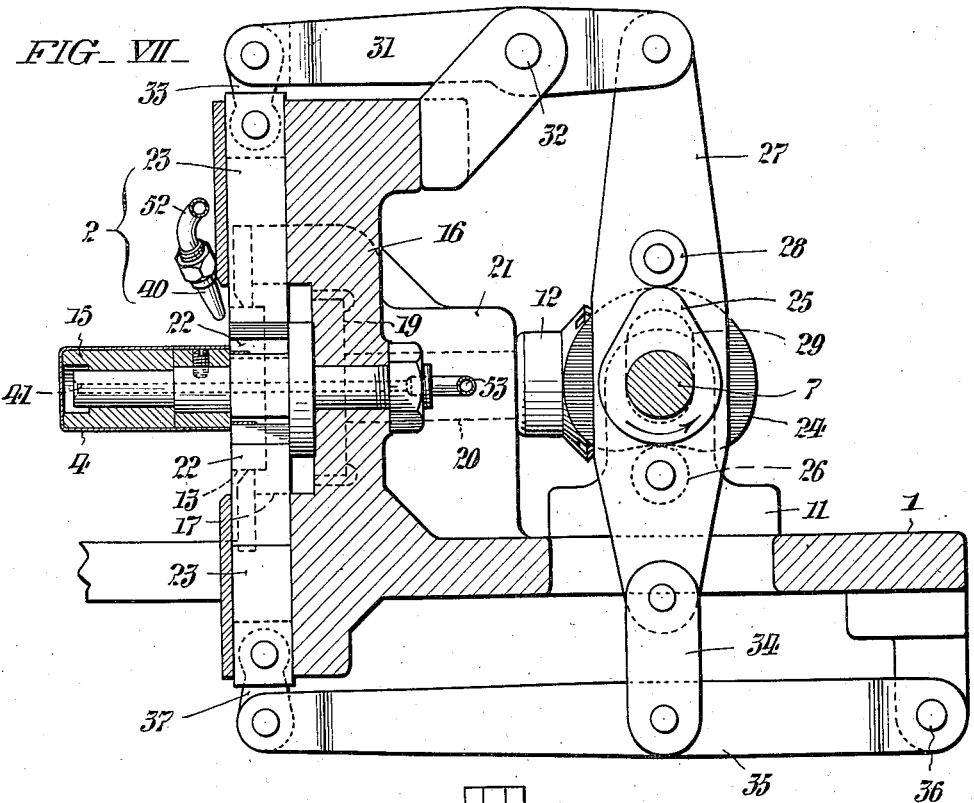
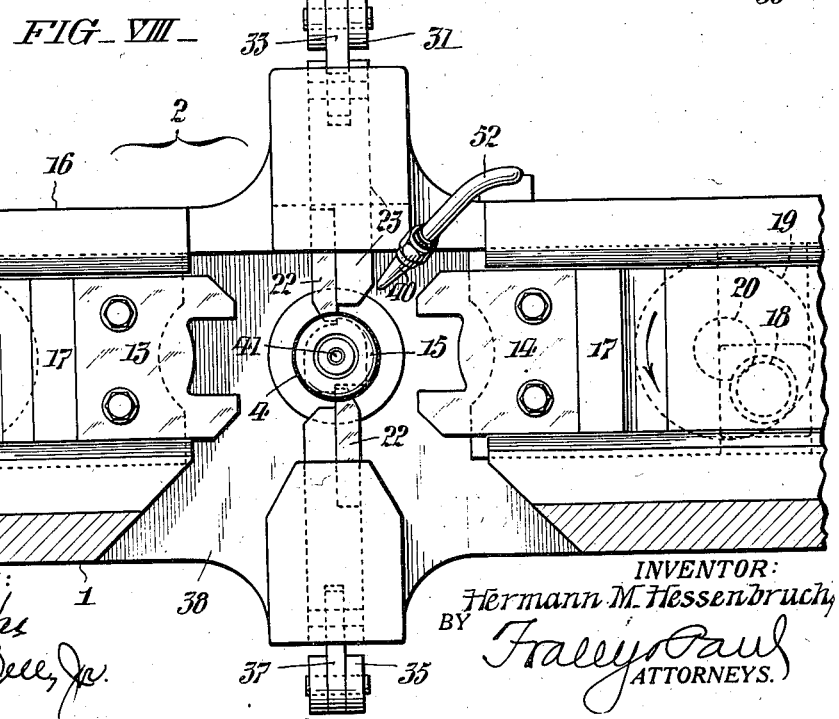

Patented June 7, 1938

2,119,942

UNITED STATES PATENT OFFICE 2,119,942

TRIMMING MACHINE

Hermann M. Hessenbruch, Wynnewood, Pa., assignor to Philadelphia Lawn Mower and Mfg. Co., Philadelphia, Pa., a corporation of Pennsylvania Application February 10, 1937, Serial No. 124,966

9 Claims. (Cl. 164—69)

My invention relates to trimming machines and more particularly to machines for cutting off the rough edges of cup-shaped articles of pressed metal. In my pending application for U. S. Letters Patent, Serial No. 32,744, filed July 25, 1935, there is shown and described a trimming machine which is fully automatic in its operation. The present invention accomplishes all of the objects set forth in said application and in addition has special advantages thereover for certain kinds of work.

One object of the invention is to provide a fully automatic trimming machine capable of running at high speeds and requiring a minimum of attention.

Another object is to provide in a machine of this character various adjustments and readily removable parts which enable the machine to be quickly converted for use with cup-shaped articles of different sizes and shapes.

Other objects of the invention are to provide improved means for guiding and conveying the articles to the vicinity of the trimming station; improved means, including a plunger having a relatively short stroke, for positively feeding the articles to the trimming station; improved means for casting off the scrap material after the trimming cuts have been effected; and improved means for withdrawing the trimmed articles out of the path of articles approaching the trimming station.

Still other objects and advantages characterizing my present invention will become more fully apparent from the description hereinafter set forth of one example or embodiment of the invention, having reference to the accompanying drawings, whereof:

Fig. I represents a plan view of a trimming machine embodying my invention, with certain parts of the feeding mechanism removed.

Fig. II represents a longitudinal cross section of the same, taken as indicated by the lines II—II of Fig. I, certain parts being omitted for clearness of illustration, and showing moving parts of the machine in the positions occupied at one particular point in the cycle of operation.

Fig. III represents an enlarged transverse section of the machine, taken as indicated by the lines III—III of Fig. I.

Fig. IV represents an additional transverse section of the same, taken as indicated by the lines IV—IV of Fig. I.

Fig. V represents an enlarged longitudinal cross section of a portion of the machine, taken similarly to Fig. II, but showing the moving parts in the positions occupied during another point in the cycle of operation.

Fig. VI represents a perspective view of a cup-shaped article adapted to be trimmed by the machine represented in the drawings.

Fig. VII represents an enlarged cross section, taken as indicated by the lines VII—VII of Fig. I, showing the mechanism for operating the spliting cutters; and, Fig. VIII represents a view of the vertical and horizontal cutters of the trimming mechanism.

With reference to the drawings, the embodiment of my invention selected for illustration comprises generally a supporting table 1 having thereon a trimming station, comprehensively designated at 2, a gravity chute designated at 3 for receiving the articles to be trimmed, and various instrumentalities for automatically guiding and conveying such articles from the gravity chute 3 to the trimming station 2 and then withdrawing and discharging the articles. The particular machine shown in the drawings is adapted to trim the rough edges of a pressed metal article 4, of the type shown in Fig. VI. In the illustrated example the articles to be trimmed are of circular cross section, and the cutting action takes place along the dot-and-dash lines indicated at 5 in Fig. VI; but the machine may obviously be adapted to trim articles of many different sizes and shapes, as hereinafter more particularly explained.

Power is supplied to the machine through a pulley 6 affixed to a main shaft 7. The main shaft 7 is geared to a connecting shaft 8 which in turn is geared to an auxiliary shaft 9, all of said shafts being suitably mounted in bearings 11 and interconnected by bevel gears 12. Through additional bevel gears 12 on the main shaft 7, the trimming mechanism is operated. More specifically, the trimming mechanism includes a pair of alternately reciprocated cutters 13, 14, suitably guided for movement horizontally towards and away from a mandrel 15 disposed on a guide plate 16 between said cutters. Each cutter 13, 14 is mounted upon a holder 17 movable in the guide plate 16, and each holder is engaged by a crank pin 18, eccentrically mounted on a rotating disc 19. The discs 19 are driven by stub shafts 20 journaled in bearings 21 and deriving their motion from the main shaft 7 through two pairs of bevel gears 12. The crank pins 18 are so disposed as to cause the U-shaped cutting edges of the cutters 13, 14 to make overlapping cuts in sequence and thus to trim a circular band of metal from the article 4 on the mandrel 15.

For severing the band of metal cut from the article 4 by the trimming cutters 13, 14, splitting cutters 22 are employed. Each splitting cutter 22 is carried by a holder 23 adapted for vertical sliding movement in guideways on the front of the guide plate 16. The mechanism for operating the splitting cutters 22 derives its movement from a pair of cams 24, 25 on the main shaft 7. As shown in Fig. VII, the cam 24 is substantially heart-shaped and engages a roller 26 on a slotted bar 27, whereas the cam 25 which is located on the other side of the slotted bar 27 is substantially pear-shaped and engages a roller 28 thereon. The main shaft 7 passes through an elongated slot 29 in the bar 27, and with rotation of the main shaft 7, it will be apparent that the action of the cams 24, 25 causes the bar 27 to reciprocate in a substantially vertical direction. At the upper end of the bar 27, there is a lever 31 pivotally connected thereto. The lever 31 is adapted to rock about a fulcrum 32 and is connected at its other end by a link 33 which is in turn connected to the upper cutter holder 23. At the lower end of the bar 27 there is a link 34 pivotally connected thereto. The link 34 is connected to a lever 35, the latter being adapted to rock about a fulcrum 36, and being in turn connected at its free end to a link 37 which joins the lower cutter holder 23. The above described parts are so designed and proportioned as to cause the splitting cutters 22 to move simultaneously towards and away from the mandrel 15, and the cams 24, 25 are so related to the crank pins 18 on the discs 19 that the action of the vertical cutters 22 immediately follows the action of the trimming cutters 13, 14.

The splitting cutters 22 sever the trimmed band of material by splitting it into two pieces which fall from the mandrel 15 through an opening 38 in the top of the table 1. An apron 39, shown most clearly in Fig. I, prevents the trimmed pieces from interfering with other parts of the machine, and guides the gravity discharge of such pieces.

At the trimming station 2, two air jets are provided, one issuing from a nozzle 40 which serves to assist the splitting cutters 22 in causing instantaneous discharge of the split pieces as soon as these cutters have done their work, and the other leading through a central orifice 41 in the mandrel 15 and serving to withdraw the article 4 from the mandrel as soon as it has been trimmed. Air is supplied through a pipe line 42. One branch from this line, designated at 43 and including a valve 44, leads to a pressure chamber 45 and through a piston 46; and link mechanism, comprehensively designated at 47, actuates a clutch mechanism (not shown) used for starting the machine in operation.

Another branch 48 conducts air through an automatic valve 49 and a hand operated valve 50 to a pipe 51. The pipe 51 divides into two branches, one branch 52 leading to the nozzle 40 and the other branch 53 leading to the central orifice 41 in the mandrel 15. The automatic valve 49 has an operating lever 54 with a roller 55 at the end thereof, operated by a cam 56, as shown in Fig. II. The cam 56 is affixed to the main shaft 7. A bracket 58 adjustably supports the automatic valve 49 and the pipe connections associated therewith. At a certain point in each revolution of the main shaft 7, the cam 56 strikes the operating lever 54 of the automatic valve 49 and causes air to be supplied both to the nozzle 40 and to the central orifice 41 within the mandrel 15. The air jet issuing from the nozzle 40 is directed at such an angle, and is so timed that as soon as the band trimmed from the article is split by the cutters 22, the pieces are immediately blown downwardly and rearwardly into the opening 38, and are thus cast off from the machine. The jet issuing from the central orifice 41 in the mandrel 15 at the same time ejects the trimmed article from the mandrel.

The articles to be trimmed are conveyed to the machine through the gravity chute 3, shown most clearly in Figs. II and V. Desirably the gravity chute 3 forms part of a continuous conveying system of the character shown and described in Letters Patent No. 1,953,757, granted to me under date of April 3, 1934. In said patent there is described an apparatus for making pressed articles by successive drawing operations and involving conduits for guidedly progressing the articles from one press to another. As each article delivered in this or some other appropriate manner to the gravity chute 3 moves toward the table 1, it first strikes a projecting arm 59 of a swinging check device 61 and is momentarily arrested preparatory to passage through a feeding mechanism towards the trimming station. The swinging check device 61 is pivoted at 62 and is normally held by means of springs 63 in the position represented in Fig. II. In this position the projecting arm 59 penetrates the gravity chute 3, and arrests the article 4 as shown in Fig. II. Desirably the arm 59 is slidably mounted on a bracket 64 and may, without swinging of the check device 61, be retracted manually against the pressure of springs 65. This is a convenience enabling the ready removal from the gravity chute 3 of any deformed or faulty articles.

The swinging check device 61 includes an actuating lever 66 which is operated automatically and in timed relation to the trimming mechanism in a manner hereinafter described, and it also includes an upsetting arm 67, which serves at one point in the operation to arrest downward movement of the article as shown in Fig. V, and serves at another point in the operation to upset an article received at the lower ledge 68 of the gravity chute 3 while striking the upper end thereof and knocking it over into a horizontal position within a box-shaped receptacle 69.

The receptacle 69 is affixed to the table 1 by means of a bracket 70, and has an open bottom through which the articles fall by gravity. As shown in Fig. III, the gravity chute 3 is adjustably secured to the bracket 70 by bolts 71 passing through an elongated slot 72. Beneath the box-shaped receptacle 69, an adjustable base plate 73 is provided, as shown most clearly in Figs. III and IV. The adjustable base plate 73 has at each side thereof an extension plate, one such plate 74 being disposed beneath the receptacle 69 and the other plate 75 leading downwardly at an angle from the base plate 73 towards a discharge chute 76. The extension plate 74 is provided with a guiding surface 77, which, together with the bracket 70 restricts lengthwise movement of the articles in their passage to the trimming station 2. Additional guiding surfaces 78, 79 are provided at each side of the extension plate 75, but such parts are separate from this extension plate.

The base plate 73 has beneath the same four guide rods 81 which pass through openings in the bed plate 82 at the top of the table 1, and which are provided with springs 83 and nuts 84, the springs being inserted between the nuts and the bed plate in such manner as to tend to draw the base plate downwardly. A threaded stem 85 having thereon an adjusting nut 86 permits the base plate 73 to be set at the desired vertical height above the bed plate 82, its position depending upon the diameter of the articles to be trimmed. Extending along the top surface of the base plate 73, there is a groove 87 which parallels the axis of the mandrel 15 and lies beneath the same, the groove serving to guide the articles as they move to and from the mandrel.

For moving the articles deposited on the extension plate 74 from the receptacle 69, a slide 88 is employed. As shown most clearly in Figs. I and III, the slide 88 is movable in a guide block 89 in a direction at right angles to the axis of the mandrel 15. More particularly, the slide 88 has a pair of spaced rollers 91 which engage diametrically opposite points on a cam 92 mounted on the connecting shaft 8. With rotation of the cam 92 the slide 88 is moved back and forth in the guide block 89. At its forward end the slide 88 has adjustably secured thereto by means of bolts 93, a pusher 94 which directly engages the articles deposited from the receptacle 69 and progresses such articles in side-by-side abutting relation along the extension plate 74 towards the groove 87 in the base plate 73. The pusher 94 has parallel slots 95 through which the adjusting bolts 93 pass. In an obvious manner the position of the pusher 94 with respect to the slide 88 can be varied to take care of articles of different diameters. The guide block 89 is also adjustably mounted on the table 1, and for this purpose adjusting bolts 96 are employed, certain of which pass through a slot 97 in the bed plate 82 and others through a lug 100.

A bracket 98 is adjustably attached to one side of the receptacle 69 by means of a bolt 99 passing through a slot 101. The bracket 98 has thereon a resilient hold down device 102 which engages the top surfaces of the articles as they are pushed towards the groove 87 in the base plate 73, thereby keeping the articles in line and causing them to pass smoothly with step-by-step progression under the influence of the intermittent movement of the slide 88. The hold down device 102 terminates in an enlarged end 103 immediately above the groove 87 which serves to firmly seat each article in the groove before its passage to the mandrel 15.

For positioning each article on the mandrel 15, a plunger 104 is provided. The plunger 104 is adjustably secured to a threaded stem 105 forming part of a sliding carriage 106. The sliding carriage 106 is guided for movement in the direction of the axis of the mandrel 15 by means of a guide block 107. On the sliding carriage 106 there are rollers 108, 109, engaged by cams 111, 112. As shown most clearly in Figs. II and V, the cams 111, 112 are affixed to the auxiliary shaft 9 and are so shaped as to cause a rapid stroke of the plunger 104 at a predetermined point in the cycle of operation of the machine. To reduce the shock incident to each stroke of the plunger 104, shock absorbing devices 113 are provided, one at each side of the sliding carriage 106. The ends of the shock absorbing device 113 are engaged by stops 114, 115 on the carriage 106. On the sliding carriage 106 there is also provided a bracket 116 which engages the actuating lever 66 of the swinging check device 61, thereby causing the swinging check device to move at the proper point in the cycle of operation.

The operation of the above described apparatus is as follows: The trimming machine is regulated to run at a speed equal to or greater than the rate at which the articles are supplied to the gravity chute 3. As each article reaches the gravity chute 3, it is momentarily arrested by the projecting arm 59 of the swinging check device 61 and held in the position shown in Fig. II. Accompanying forward movement of the sliding carriage 106, the bracket 116 strikes the operating lever 66 of the swinging check device 61, causing this device to reverse its position, and dropping the article previously admitted to the gravity chute 3 to the position indicated in Fig. V, where it rests upon the upsetting arm 67. At the same time the forward movement of the upsetting arm 67 acts upon the article received at the lower ledge 68, turning it end for end and depositing it in the receptacle 69. Thus the articles are fed singly with temporarily arrested movement at the base of the gravity chute 3, and they are then turned end for end and deposited within the receptacle 69.

Immediately after each article is discharged through the open base of the receptacle 69 onto the extension plate 74, the slide 88 progresses the article one step toward the groove 87 of the base plate 73. With such forward movement of the slide 88 and its plunger 94, an article is deposited in the groove 87, but if the articles are not supplied to the gravity chute 3 at a rate as rapid as the operation of the trimming machine, and for this reason no article is discharged through the receptacle 69, the machine merely goes through a cycle of operation without advancing an additional article toward the trimming station 2. As the articles advance with step-by-step progression toward the groove 87 in the base plate 73, they are held in proper side-by-side abutting relation by means of the hold down piece 102. Each time an article enters the groove 87 in the base plate 73, the plunger 104 immediately moves forward and strikes the base of the article and advances it to a position surrounding the mandrel 15.

As soon as an article is received upon the mandrel 15, the trimming operation commences. First one of the trimming cutters 13, 14 moves toward the mandrel 15, and penetrates through a little more than one-half of the circumference of the article, then the other trimming cutter comes into action from the other side, overlapping the previous cut and causing the complete severance of a band of metal along the lines indicated at 5 in Fig. VI. As soon as the trimming has thus been accomplished, the vertical splitting cutters 22 move simultaneously from above and below the mandrel 15 and split the trimmed portion of metal into two pieces. At this moment an air jet issues from the nozzle 40 and the trimmed pieces are cast off one at each side of the mandrel 15 and caused to drop through the opening 38 in the table 1 clear of the operating parts of the machine. At the same time that the air jet issues from the nozzle 40, as the result of the operation of the automatic valve 49, by engagement of the cam 56 with its operating lever 54, an additional air jet is caused to issue from the orifice 41 within the mandrel 15, this jet impinging upon the base of the article on the mandrel, and causing the article to be propelled rearwardly in a reverse direction to that from which it has approached the mandrel. The article in rebounding enters the groove 87 in the path of the article just approaching a groove under the influence of the slide 88. Accordingly the trimmed article is struck by the article about to enter the groove 87 and is positively propelled toward the discharge chute 76, by means of which it may be carried away from the machine to a cleaning bath.

It will be observed that the various movements described above follow automaticaly in a predetermined succession at predetermined points in the revolution of the main shaft 7, and hence in timed relation to the action of the cutting means. The articles are conveyed singly toward the trimming station 2, and are guided throughout their movement in such manner as to minimize the danger of jamming at any point in the system. Furthermore, it will be particularly noted that the critical movements involved in the operation of the machine are of a positive nature. For example, each article after it is trimmed is positively withdrawn and ejected out of the path of other articles approaching the trimming station. The split pieces of scrap material are positively cast off from the mandrel, and the action of the slide 88 and the plunger carriage 106 in each instance causes a positive movement of the article operated on. Such positive movements properly timed with respect to each other enable the machine to be operated at a high rate of speed. It will also be apparent that the relatively short stroke provided for the plunger 104 is an additional factor in enabling the machine to be operated at a relatively high speed.

The various adjustments described in detail herein enable the machine to be quickly adapted from use with articles of one size and shape to use with articles of a different size and shape. Minor changes in the position of the various parts permit the machine to be adjusted to take care of cylindrical articles of greater or less diameter or of greater or less length, and by means of other changes the machine can be adapted to take care of articles of a different cross section, such as square or rectangular articles.

While I have described my invention with reference to a specific embodiment thereof, designed for the manufacture of a cup-shaped article, and have described in some detail a preferred form of trimming mechanism and feeding mechanism, it will be apparent that various changes may be made in the machine herein described and illustrated without departing from the spirit of the invention, and that certain features of the invention may at times be used to advantage without a corresponding use of other features.

Having thus described my invention, I claim:

1. In a trimming machine of the character described, a mandrel for receiving a cup-shaped article, cutting means for trimming the edges of the article while on said mandrel, means for guidedly conveying the articles towards said mandrel and feeding them singly thereto in timed relation to the operation of said cutting means, a pressure jet within said mandrel for removing the articles therefrom, said jet operating automatically at the completion of the trimming operation, and means whereby the articles approaching said mandrel are guided to strike the article which has been trimmed and withdrawn from the mandrel and to cast it clear of said approaching articles.

2. In a trimming machine of the character described, a mandrel for receiving a cup-shaped article, cutting means for trimming the edges of the article while on said mandrel, a plunger in line with the axis of said mandrel for positioning the articles one at a time on said mandrel, means for guidedly conveying the articles in side by side abutting relation in a path at right angles to the axis of the mandrel and with step by step progression, thereby to feed them singly to a position between said plunger and mandrel, means for withdrawing the articles from said mandrel and returning them towards said plunger, said plunger and said conveying and withdrawing means all operating in timed relation to said cutting means, and means whereby the articles approaching said mandrel in a path at right angles to the axis thereof are guided to strike the article which has been trimmed and withdrawn to cast it clear of said approaching articles.

3. In a trimming machine of the character described, a mandrel for receiving exteriorly a cup-shaped article, oppositely disposed cutters operating in sequence to trim the article on said mandrel by fractional cuts with incidental severance of a band at the rim of said article, means operating in timed relation to said cutters for splitting said band, and a pressure jet for casting off said split pieces.

4. In a trimming machine of the character described, a mandrel for receiving exteriorly a cup-shaped article, oppositely disposed cutters operating in sequence to trim the article on said mandrel by fractional cuts with incidental severance of a band at the rim of said article, oppositely disposed cutters operating simultaneously to split said band, and a pressure jet for casting off said split pieces.

5. In a trimming machine of the character described, a mandrel for receiving exteriorly a cup-shaped article, oppositely disposed cutters operating in sequence to trim the article on said mandrel by fractional cuts with incidental severance of a band at the rim of said article, means operating in timed relation to said cutters for splitting said band, and pressure jets operating in timed relation to said cutters, one of said jets serving to cast off said split pieces, and another jet serving to withdraw the article from the mandrel.

6. In a trimming machine of the character described, a mandrel for receiving exteriorly a cup-shaped article, cutting means for trimming the edges of the article while on said mandrel, a plunger in line with the axis of said mandrel for positioning the articles one at a time on said mandrel, means including a base plate and a slide operating thereon for guidedly conveying the articles in side by side abutting relation in a path at right angles to the axis of the mandrel and with step by step progression, thereby to feed the articles singly to a position between said plunger and mandrel, and means for withdrawing the article from said mandrel, said plunger, slide and withdrawing means all operating in timed relation to each other.

7. A trimming machine as set forth in claim 6, in which the base plate is vertically adjustable with respect to said mandrel to take care of articles of different diameters.

8. A trimming machine as set forth in claim 6, in which the base plate has therein a groove paralleling the axis of the mandrel and beneath the same, said groove serving to guide the articles as they move to and from said mandrel.

9. A trimming machine as set forth in claim 6, in which the base plate is vertically adjustable and the slide is horizontally adjustable with respect to said mandrel to take care of articles of different dimensions.

HERMANN M. HESSENBRUCH.